US007499405B2

(12) United States Patent
Gilfix et al.

(10) Patent No.: US 7,499,405 B2
(45) Date of Patent: Mar. 3, 2009

(54) METHOD FOR TESTING BRANCH EXECUTION AND STATE TRANSITION LOGIC IN SESSION INITIATION PROTOCOL APPLICATION MODULAR COMPONENTS

(75) Inventors: Michael A. Gilfix, Austin, TX (US); Rhys D. Ulerich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 11/168,719

(22) Filed: Jun. 28, 2005

(65) Prior Publication Data

US 2007/0008892 A1   Jan. 11, 2007

(51) Int. Cl.
*H04L 12/26* (2006.01)
*H04L 9/00* (2006.01)
*G06F 15/16* (2006.01)
*G06F 17/50* (2006.01)

(52) U.S. Cl. .................. 370/241; 703/13; 709/224; 709/227; 713/201

(58) Field of Classification Search ................ 370/241; 703/13; 709/224, 227; 713/201
See application file for complete search history.

(56) References Cited

U.S. PATENT DOCUMENTS

| 4,396,983 | A | * | 8/1983 | Segarra et al. ............... 709/227 |
| 5,045,994 | A | | 9/1991 | Belfer et al. ................. 364/200 |
| 5,153,886 | A | | 10/1992 | Tuttle ........................ 371/67.1 |
| 5,745,675 | A | | 4/1998 | Herbig et al. ............. 395/183.14 |
| 6,216,098 | B1 | | 4/2001 | Clancey et al. .................. 703/6 |
| 6,691,257 | B1 | * | 2/2004 | Suffin ........................... 714/43 |
| 6,718,535 | B1 | | 4/2004 | Underwood ................ 717/101 |
| 6,931,453 | B2 | * | 8/2005 | Aarnos et al. ............... 709/245 |
| 7,076,393 | B2 | * | 7/2006 | Ormazabal et al. .......... 702/122 |
| 7,243,370 | B2 | * | 7/2007 | Bobde et al. .................. 726/10 |
| 2003/0126257 | A1 | * | 7/2003 | Vijay ........................ 709/224 |
| 2004/0003070 | A1 | * | 1/2004 | Fernald et al. .............. 709/223 |
| 2004/0205190 | A1 | * | 10/2004 | Chong et al. ................ 709/225 |
| 2005/0076235 | A1 | * | 4/2005 | Ormazabal et al. .......... 713/201 |
| 2005/0076238 | A1 | * | 4/2005 | Ormazabal et al. .......... 713/201 |
| 2006/0031522 | A1 | * | 2/2006 | Soulhi et al. ................ 709/227 |
| 2006/0224730 | A1 | * | 10/2006 | Fok et al. .................... 709/224 |
| 2006/0262729 | A1 | * | 11/2006 | Chau et al. .................. 370/250 |

OTHER PUBLICATIONS

Handley et al., "RFC 2543—SIP: Session Initiation Protocol", Internet RFC/STD/FYI/BCP Archives, http://www.faqs.org/rfcs/rfc2543.html, The Internet Society, 1999, pp. 1-113.
Java Community Process, JSR-000116 SIP Servlet API—Public Review, May 2002, http://www.jcp.org/aboutJava/community_process/review/jsr116/.
http://www.sipcenter.com/, retrieved Apr. 6, 2005.

* cited by examiner

*Primary Examiner*—Alpus H Hsu
(74) *Attorney, Agent, or Firm*—Duke W. Yee; Herman Rodriguez; Houda T. El - Jarrah

(57) ABSTRACT

A system for testing branch execution and state transition logic in session initiation protocol application modular components. A test harness constructs, sends, and initializes an artificial session initiation protocol runtime environment in order to test session initiation protocol application modular components. The artificial session initiation protocol runtime environment simulates session initiation protocol messages and a determines whether an appropriate session initiation protocol event occurs. Subsequent to determining whether the appropriate session initiation protocol event occurs in response to the simulated session initiation protocol messages, a report of the test results is generated.

1 Claim, 4 Drawing Sheets

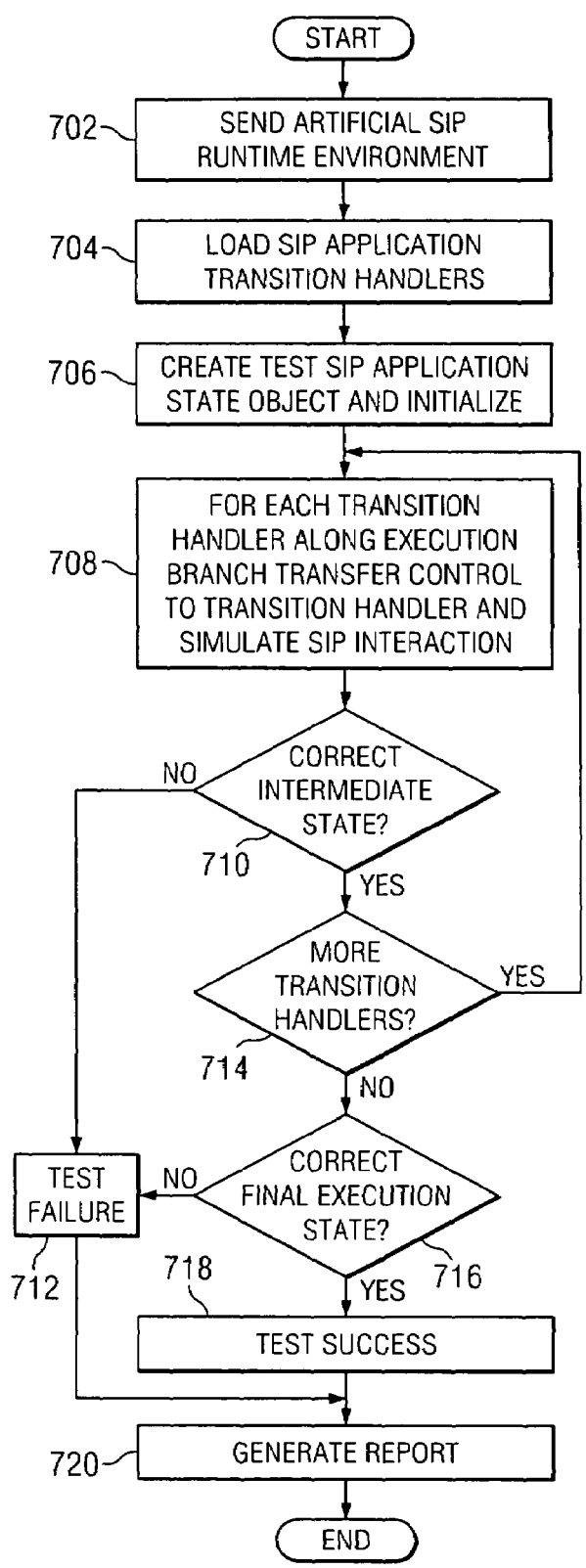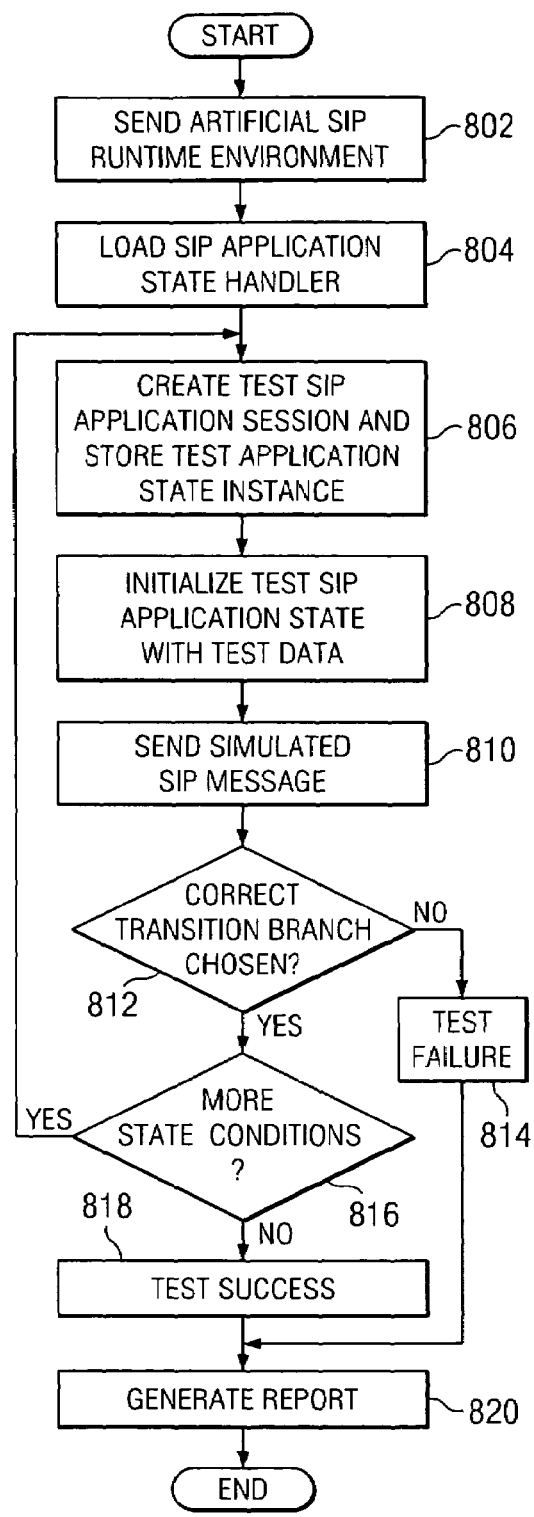

METHOD FOR TESTING BRANCH EXECUTION AND STATE TRANSITION LOGIC IN SESSION INITIATION PROTOCOL APPLICATION MODULAR COMPONENTS

BACKGROUND OF THE INVENTION

1. Field of the Invention

The present invention relates to an improved data processing system. More specifically, the present invention is directed to a method, apparatus, and computer usable code for testing branches of execution and state transition logic in session initiation protocol application modular components.

2. Description of the Related Art

Session initiation protocol (SIP) is a signaling protocol for Internet conferencing, telephone, presence, event notification, and instant messaging. SIP was developed within the Multiparty Multimedia Session Control (MMUSIC) working group and issued by the Internet Engineering Task Force (IETF). Having been developed as a mechanism to only initiate, modify, and terminate communication sessions, SIP does not know the specific details of the communication sessions. Consequently, SIP is scalable, extensible, and may sit comfortably in different architectures and deployment scenarios.

SIP allows disparate computers, phones, televisions, and software to communicate via SIP messages. The structure of a SIP message is similar to a hypertext transfer protocol (HTTP) message, but with an addressing scheme similar to simple mail transfer protocol (SMTP). Using SIP, Internet users may locate and contact one another regardless of media content and number of participants. SIP negotiates communication sessions such that all users associated with a communication session may agree on and modify session features. Through SIP, participants may also add, drop, or transfer users.

SIP is used primarily in SIP applications. SIP applications are developed within SIP application servers using a servlet model, such as, for example, the Servlet model defined in Java™ Specification Requests (JSR) 116. SIP servlets are similar to HTTP servlets.

While SIP provides a flexible scheme for establishing sessions of communication between Internet users, developers of SIP applications often find it difficult to track SIP interactions as the complexity of SIP applications grows. SIP applications require developers to maintain application state and lifecycle, as well as execution flows, between different users. For example, if a third party joins a two party call, communication paths between parties increase as a result. This process becomes a tedious task for developers of SIP applications, since state transitions between users also increase. As a result, complex SIP applications may require a significant number of different interactions, depending upon the SIP application state and context. Currently, effective testing of SIP applications is difficult because the design paradigm of SIP applications has limited support for the SIP application composition and modularity.

Therefore, it would be advantageous to have an improved method and system for testing branch execution and state transition logic of SIP application modular components that may include multiple, complex interactions.

SUMMARY OF THE INVENTION

Embodiments of the present invention provide a method, apparatus, and computer usable code for testing branch execution and state transition logic in session initiation protocol application modular components. A test harness contained within a session initiation protocol server constructs and initializes an artificial session initiation protocol runtime environment in a session initiation protocol application to test the session initiation protocol application modular components. Session initiation protocol messages are simulated in the artificial session initiation protocol runtime environment and a determination is made as to whether an appropriate session initiation protocol event occurs. Subsequent to determining whether the appropriate session initiation protocol event occurs in response to the simulated session initiation protocol messages, the test harness generates a report of the test result.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart illustrating an exemplary process for testing branches of execution in a SIP application in accordance with an embodiment of the present invention; and FIG. 8 is a flowchart illustrating an exemplary process for testing state transition in a SIP application in accordance with an embodiment of the present invention.

DETAILED DESCRIPTION OF THE PREFERRED EMBODIMENT

Figure 1:
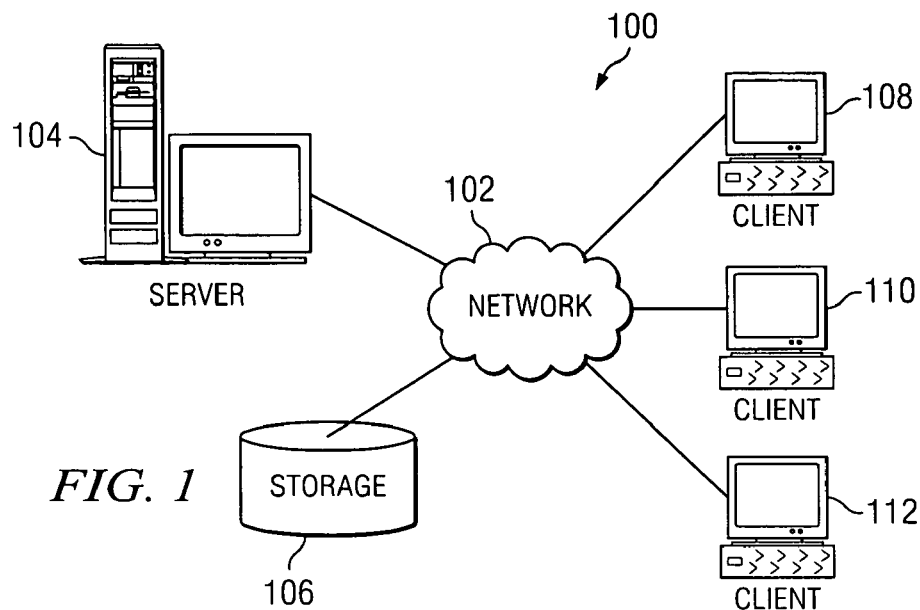
FIG. 1 depicts a pictorial representation of a network of data processing systems in which an embodiment of the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
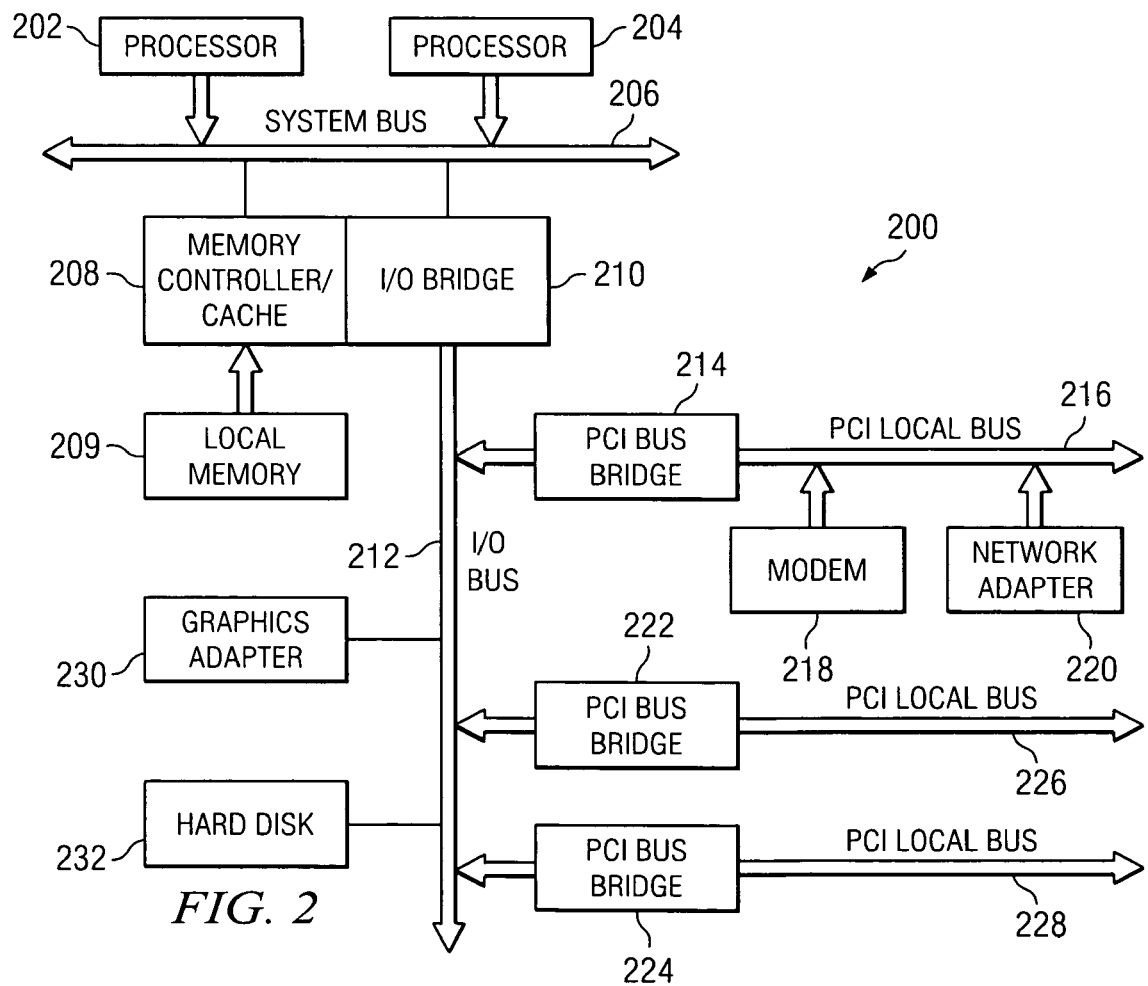
FIG. 2 is a block diagram of a data processing system that may be implemented as a server in which an embodiment of the present invention may be implemented.

Referring to FIG. 2, a block diagram of a data processing system that may be implemented as a server is depicted in which an embodiment of the present invention may be implemented. Data processing system 200 may be, for example, server 104 in FIG. 1. Also, data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ pSeries® system, a product of International Business Machines Corporation in Armonk, N.Y., running the Advanced Interactive Executive (AIX®) operating system or LINUX operating system.

Figure 3:
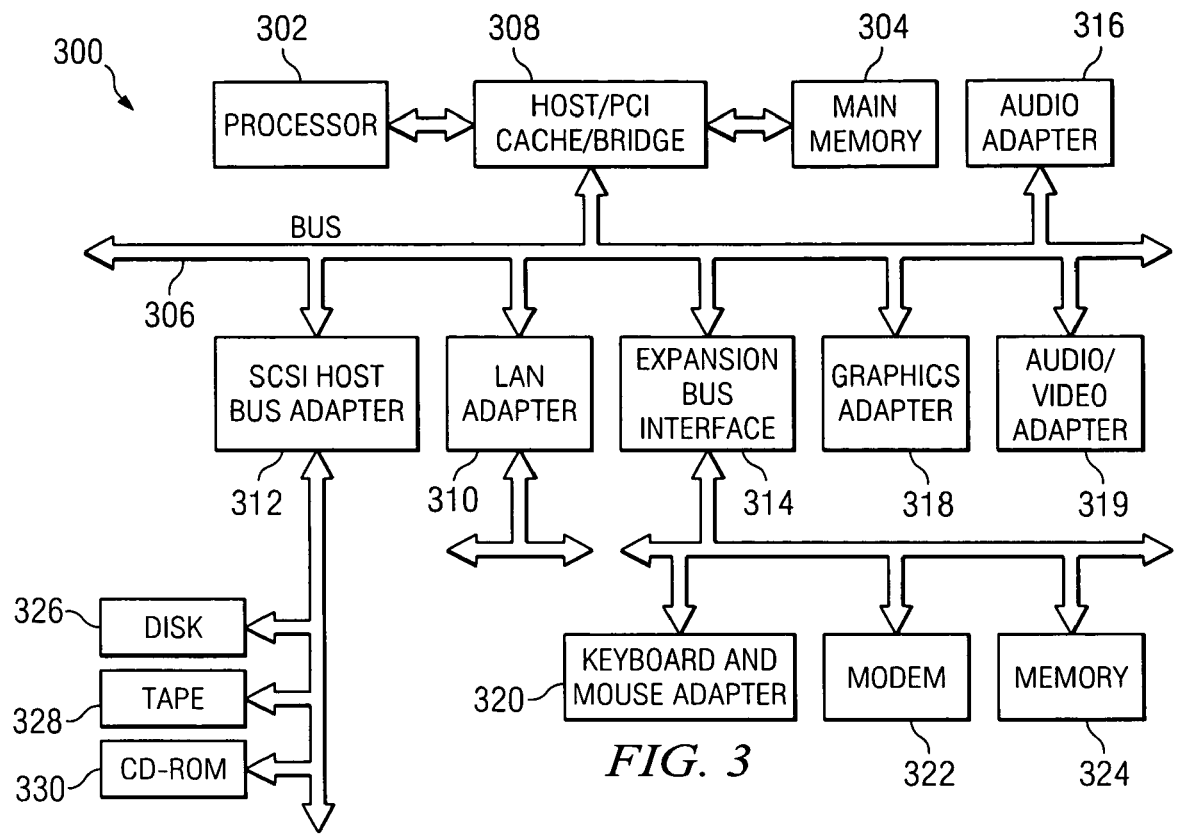
FIG. 3 is a block diagram illustrating a data processing system that may be implemented as a client in accordance with an embodiment of the present invention.

With reference now to FIG. 3, a block diagram illustrating a data processing system that may be implemented as a client is shown in accordance with an embodiment of the present invention. Data processing system 300 may be, for example, client 108 in FIG. 1. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® XP, which is available from Microsoft® Corporation. An object oriented programming system such as Java™ may run in conjunction with the operating system and provide calls to the operating system from Java™ programs or applications executing on data processing system 300. "Java" is a trademark of Sun™ Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

For example, data processing system 300 may be a standalone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for testing branch execution and state transition logic in session initiation protocol application modular components. A test harness constructs and initializes an artificial session initiation protocol runtime environment in order to test modular components of a session initiation protocol application. The artificial session initiation protocol runtime environment simulates session initiation protocol messages. A determination is made as to whether an appropriate session initiation protocol event occurs in response to the simulated messages. Subsequent to determining whether the appropriate session initiation protocol event occurs, the test harness generates a report of the test results.

Embodiments of the present invention provide a method for testing branches of execution and state transition logic for modular components of an SIP application. A framework for the SIP application assembles and manages execution of the modular components. The framework models the SIP applications as state machines. In other words, each modular component performs a task suited to a specific aspect of the state machine. The framework receives an input, a markup language model, which describes various states of the SIP application and an SIP application execution flows that may occur during state changes. In the context of an embodiment of the present invention, an SIP application may be implemented, for example, using JSR 116, which is an SIP servlet application programming interface (API) specification based on the model of the existing servlet API.

The framework not only manages execution flow of an SIP application, but the framework also stores and retrieves global SIP application states on behalf of the SIP application. Also, the framework determines which modular components should receive flow control. By determining which modular components receive flow control, the framework enables greater re-use of SIP application modular components, reduces SIP application complexity, and enables the use of tooling for modeling application logic.

The SIP application framework includes four major modular components that are specific to each SIP application: application data, precondition handlers, transition handlers, and postcondition handlers. Application data is an object that holds global SIP application state and is required throughout the SIP application lifecycle. Also, the application data is passed to the various modular components to provide a common data container. When messages are received by the SIP application, the application data parses the body of the messages and stores the content in an internal format for use by the modular components.

A precondition handler examines the application data to determine if specific preconditions are met. A handler is a software routine that performs a particular task. Preconditions represent the state conditions that must be met for an SIP application to execute a particular state transition. By examining the preconditions, the framework may determine the next state transition to be taken when processing an incoming message in a given state.

A transition handler is a modular or 'mini' SIP application that contains logic for handling one aspect of the SIP application. A transition handler receives and processes an SIP message and stores the information in the transition handler's instance variables. An application developer defines the scope of the transition handler. Transition handlers may be chained together to construct a state transition for an SIP application. Flow control between transition handlers may be performed by a framework controller. If transition handlers are developed to work in a wide variety of scenarios by writing additional logic so that the transition handlers may deal with dynamic conditions, the transition handlers may be reused.

A postcondition handler examines the application data to determine if specific postconditions are met. Postconditions represent the state conditions that should be met after executing a transition between states. By examining the post conditions, a framework controller may determine if a state transition should be considered successful.

The framework controller manages execution flows throughout the SIP application lifecycle. An SIP application lifecycle is typically associated with the lifetime of an SIP application session object or another appropriate session object. The framework controller accepts an input markup language that describes information, which includes the application data, flow of the application, and a list of state transitions in the SIP application. The input markup language model may be an extensible markup language (XML) deployment descriptor that is deployed for a particular SIP application.

The application data includes data that is specific to the SIP application. The flow of the SIP application includes various states of the application and future states that are accessible by each state. Thus, the flow of the SIP application is in a state machine format. In the list of state transitions, each state transition includes necessary precondition and postcondition handlers and a list of transition handlers to be executed for a state transition.

Figure 4:
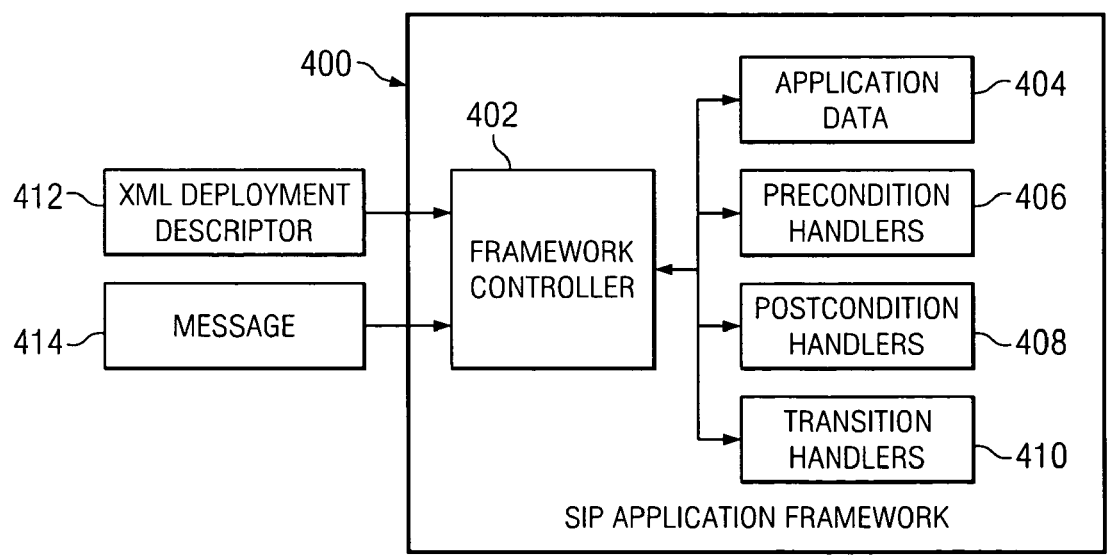
FIG. 4 is an exemplary block diagram illustrating SIP application framework component interaction in accordance with an embodiment of the present invention.

Turning now to FIG. 4, an exemplary block diagram illustrating SIP application framework component interaction is depicted in accordance with an embodiment of the present invention. As shown in FIG. 4, SIP application framework 400 includes framework controller 402, application data 404, precondition handlers 406, postcondition handlers 408 and transition handlers 410.

When an SIP application is deployed to a user environment, a deployment description, such as XML deployment descriptor 412, is also deployed to configure the SIP application for execution. XML deployment descriptor 412 describes information about SIP application components, including the flow of control between application components.

When a user sends message 414 via the SIP application to another user, framework controller 402 uses XML deployment descriptor 412 as an input to SIP application framework 400. Framework controller 402 then parses message 414 and updates application data 404 with the content of message 414. Framework controller 402 then retrieves a state of the SIP application from application data 404 and determines if the SIP application is at the start of a state.

If the SIP application is at a defined state, for example, not transitioning between application states, framework controller 402 evaluates preconditions by examining application data 404 to determine which state transition to take. If no precondition is defined by application data 404, then framework controller 402 proxies message 414 to transition handler 410 for a state transition. If preconditions are defined, framework controller 402 loads the next set of precondition handlers 406 to determine if specific preconditions are met. After each precondition handler 406 determines that preconditions are met, framework controller 402 invokes methods of each transition handler 410 according to XML deployment descriptor 412 and passes in message 414 and application data 404 as input arguments. Then, each transition handler 410 updates the result of the state of the SIP application, which includes evaluating post conditions using postcondition handlers 408. Thus, using SIP application framework 400, a user may keep track of all states of the SIP application.

Figure 5:
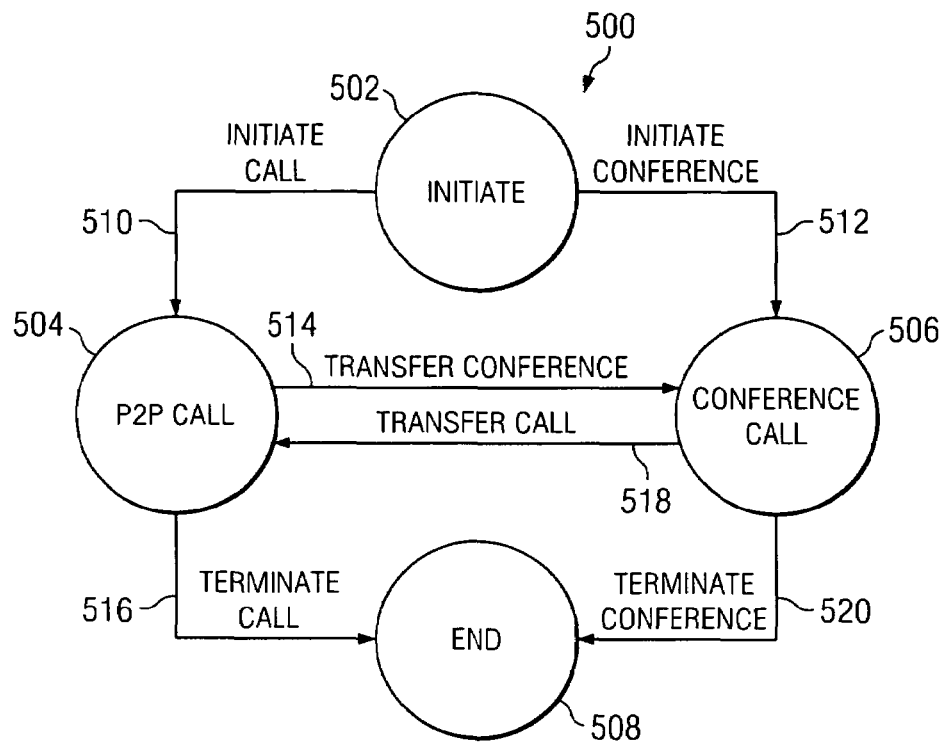
FIG. 5 is an exemplary SIP application state transition diagram for a back-to-back user agent in accordance with an embodiment of the present invention.

With reference now to FIG. 5, an exemplary SIP application state transition diagram for a back-to-back user agent is shown in accordance with an embodiment of the present invention. When a back-to-back user agent or a callplacer places a call, the SIP application establishes a call between parties on behalf of a user agent. Throughout the lifetime of a call, the number of parties may change. Thus, the SIP application requires the ability to transfer from a direct person to person (P2P) call to a conference call or vice versa.

As depicted in FIG. 5, SIP application state transition diagram 500 includes state transitions for initiating, transferring, and terminating P2P and conference calls. SIP application 500 may be, for example, SIP application 400 in FIG. 4. Each circle in SIP application state transition diagram 500 represents a state and each arrow represents a state transition. Each state includes one or more state transitions. Each state transition involves one or more steps, meaning multiple transition handlers may be required for the state transition. Consequently, each state transition requiring more than one step has multiple transition handlers chained together to handle the state transition.

In this example, SIP application state transition diagram 500 includes four states: initiate 502, P2P call 504, conference call 506 and end 508. Initiate 502, P2P call 504, conference call 506 and end 508 may be, for example, application data 404 in FIG. 4. Initiate 502 includes two state transitions, initiate call 510 and initiate conference 512. Initiate call 510 and initiate conference 512 may be, for example, transition handlers 410 in FIG. 4. P2P call 504 also includes two state transitions, transfer conference 514 and terminate call 516. Similarly, conference call 506 includes two state transitions, transfer call 518, and terminate conference 520. End 508 has no state transition since all calls terminate at this state.

Figure 6:
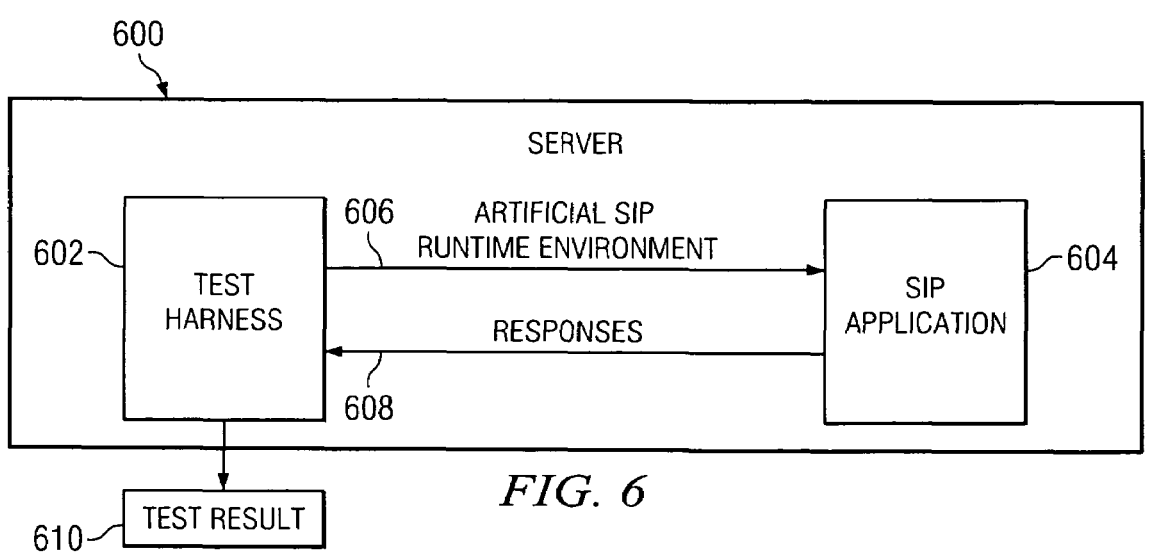
FIG. 6 is an exemplary block diagram illustrating interaction between an SIP application and a test harness in accordance with an embodiment of the present invention.

Referring now to FIG. 6, an exemplary block diagram is depicted illustrating interaction between an SIP application and a test harness in accordance with an embodiment of the present invention. The process illustrated in FIG. 6 may be implemented in a server, such as server 600, which may be, for example, server 104 in FIG. 1. SIP application 604 may be, for example, SIP application 500 in FIG. 5. Test harness 602 is utilized to test branches of execution and state transitions in SIP application 604. A test harness is used to automatically exercise programming code of an application. The test harness selects a test to be run on the application, creates an artificial runtime environment for the application, analyzes the output of the application for expected results, and then generates a report of the test result.

An SIP application developer creates artificial SIP runtime environment 606. Artificial SIP runtime environment 606 is specifically created to test SIP application 604. Test harness 602 deploys artificial SIP runtime environment 606 to SIP application 604 to automatically exercise selected branches of execution and state transitions in SIP application 604.

Test harness 602, using artificial SIP runtime environment 606, tests each module in SIP application 604, for example, SIP application modules 404-410 in FIG. 4, in isolation, to verify each module's behavior. In other words, test harness 602 may test, for example, the transition in SIP application 500 from initiate state 502 to P2P call state 504 by seeding the application call state with test data and using initiate call transition handler 510 in FIG. 5, for the purpose of determining proper and complete branch execution and state transition. During test harness 602 testing of execution branches and state transitions in SIP application 604, SIP application 604 sends responses 608 to test harness 602. Test harness 602 analyzes responses 608 for expected or unexpected results. Test harness 602 determines if SIP application testing is a success or a failure depending upon responses 608. Subsequent to determining if the test of SIP application 604 is a success or failure, test harness 602 generates test result report 610.

Turning now to FIG. 7, a flowchart illustrating an exemplary process for testing branches of execution in an SIP application is shown in accordance with an embodiment of the present invention. The process illustrated in FIG. 7 may be implemented in a server, such as server 104 in FIG. 1.

Because the SIP application framework, for example, SIP application framework 400 in FIG. 4, exploits the state machine concept, branches of execution in an SIP application are well-defined. These well-defined SIP application branches of execution may contain several modular steps, in the form of transition handlers. A single transition, such as terminate call transition handler 516 in FIG. 5, from a state, such as P2P call state 504 in FIG. 5, may consist of a series of complex interactions. In addition, data dependencies may exist between transition handlers. For example, a transition handler early in the transition handler chain may modify the SIP application state in a way that a downstream transition handler may not expect. This unexpected upstream transition handler modification occurs because a data interface to a given transition handler implies a contract that must be properly handled by the application developer. Consequently, testing of the well-defined execution branches is necessary to ensure proper performance during SIP application state transition.

A test harness may be designed to take advantage of the SIP application framework design. The test harness deploys an artificial runtime environment to the SIP application that can initialize the SIP application data class, such as application data 404 in FIG. 4, to include different types of data that occurs at the start of a given state. The test harness exercises the various steps of a state transition in order to check whether the SIP application arrives at the proper destination state, or whether the SIP application recognizes and handles errors along the way. As a result, the test harness exercises the SIP application at the transactional level because a state transition represents an SIP application transition through multiple components and steps within the SIP application.

The process begins when a test harness constructs and sends an artificial SIP runtime environment to test an SIP application (step 702). For example, test harness 602 deploys artificial SIP runtime environment 606 to test SIP application 604 in FIG. 6. In this particular SIP application test, the test harness tests whether, for a given sample input application state and a given state transition, the application interacts with the outside world in a correct manner and arrives at the end of the transition with the correct application state. In addition, it is also possible for the test harness to verify intermediary states after each step in a given state transition.

In response to the test harness sending the artificial SIP runtime environment to the SIP application in step 702, the SIP application loads appropriate transition handlers (step 704). The artificial SIP runtime environment creates and initializes the selected SIP application destination state that tests the appropriate transition handlers loaded in step 704 (step 706). The artificial SIP runtime environment transfers control to the first transition handler along the selected execution pathway and sends a simulated SIP interaction (step 708).

Subsequent to the artificial SIP runtime environment transferring control to the first transition handler and sending the simulated SIP interaction in step 708, a determination is made as to whether a correct intermediate SIP application state is achieved (step 710). If the correct intermediate state is not achieved, the no output of step 710, then a test failure result is sent to the test harness (step 712). For example, SIP application 604 sends response 608 to test harness 602 in FIG. 6. After the test failure is sent to the test harness in step 712, the test harness generates a report of the test result (step 720) and the process terminates thereafter.

If the correct SIP application intermediate state is achieved, the yes output of step 710, then a determination is made as to whether another transition handler exists along the selected execution pathway (step 714). If another transition handler exists along the selected execution pathway, the yes output of step 714, then the process returns to step 708. If another transition handler does not exist along the selected execution pathway, the no output of step 714, then a determination is made as to whether the correct final execution state is achieved (step 716). If the correct final execution state is not achieved, the no output of step 716, then the process returns to step 712. If the correct final execution state is achieved, the yes output of step 716, then a test success result is sent to the test harness (step 718) and the process returns to step 720.

With reference now to FIG. 8, a flowchart illustrating an exemplary process for testing state transition in an SIP application in accordance with an embodiment of the present invention is depicted. The process illustrated in FIG. 8 may be implemented in a server, such as server 104 in FIG. 1.

Because transition handlers, such as transition handlers 410 in FIG. 4, contain logic that is only concerned with a small sub-section of the SIP application flow, the transition handlers provide an ample opportunity for testing. A test harness, such as test harness 602 in FIG. 6, may be designed to instantiate transition handlers and simulate interaction with the transition handler using a variety of simulated SIP application scenarios. The test harness initializes the transition handler by calling a prepareHandler, which simulates passing control to that portion of the SIP application. A prepareHandler allows a transition handler, in a series of transition handlers, to prepare for handling a request. Also, the test harness simulates a series of SIP messages.

An artificial SIP runtime environment, such as artificial SIP runtime environment 606 in FIG. 6, creates simulated SIP messages as well as expected responses for testing of an SIP application, such as SIP application 604 in FIG. 6. The test harness initializes the selected transition handler and sends simulated SIP messages when appropriate. Since the number of SIP interactions for transition handlers is well-defined, testing of the transition handlers is feasible. Testing of the SIP application also ensures that the transition handler passes control or terminates at the appropriate point in the SIP interaction.

The process begins when a test harness constructs and sends an artificial SIP runtime environment to test an SIP application (step 802). For example, test harness 602 deploys artificial SIP runtime environment 606 to test SIP application 604 in FIG. 6. In this particular test, an SIP application transitions from one state to another but there are many possible state transitions. The test harness injects data to cause a particular state transition to occur and then checks to ensure that the particular state is achieved. In other words, the test harness selects an event to take place and then makes sure that the selected event properly and completely occurs.

In response to the test harness sending the artificial SIP runtime environment to the SIP application in step 802, the SIP application loads a selected SIP state handler (step 804). The artificial SIP runtime environment creates and stores the appropriate SIP application state instance (step 806). The artificial SIP runtime environment initializes the selected SIP state with test data (step 808) and sends a simulated SIP message (step 708).

Subsequent to the artificial SIP runtime environment initializing the selected SIP state in step 808 and sending the simulated SIP message to the SIP application in step 810, a determination is made as to whether a correct transition branch is chosen (step 812). If the correct transition branch is not chosen, the no output of step 812, then a test failure result is sent to the test harness (step 814). For example, SIP application 604 sends response 608 to test harness 602 in FIG. 6. After the test failure is sent to the test harness in step 814, the test harness generates a report of the test result (step 820) and the process terminates thereafter.

If the correct transition branch is chosen, the yes output of step 812, then a determination is made as to whether another state transition can be achieved from the selected test state (step 816). If another state can be achieved from the selected test state, the yes output of step 816, then the process returns to step 806. If another state cannot be achieved from the selected test state, the no output of step 816, then a test success result is sent to the test harness (step 818) and the process returns to step 820.

Thus, embodiments of the present invention provide a method, apparatus, and computer usable code for testing branch execution and state transition logic in session initiation protocol application modular components. The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and digital video device (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for testing branch execution and state transition logic in session initiation protocol application modular components, the method comprising:

initializing the artificial session initiation protocol runtime environment, wherein the artificial session initiation protocol runtime environment is created by a session initiation protocol application developer, and wherein the artificial session initiation protocol runtime environment creates and initializes a selected session initiation protocol application destination state;

sending an artificial session initiation protocol runtime environment constructed by a test harness to a session initiation protocol application to test the session initiation protocol application modular components, wherein the session initiation protocol application modular components load the artificial session initiation protocol runtime environment and send responses to the test harness, and wherein the session initiation protocol application modular components comprise application data, precondition handlers, transition handlers, and postcondition handlers;

responsive to sending the artificial session initiation protocol runtime environment, loading the transition handlers;

transferring control from the artificial session initiation protocol runtime environment to a first transition handler along a selected execution pathway;

simulating a session initiation protocol message, wherein the artificial session initiation protocol runtime environment sends the session initiation protocol message;

determining whether an appropriate session initiation protocol state occurs in response to the simulated session initiation protocol message, wherein the appropriate session initiation protocol state comprises at least one of a particular session initiation protocol application state and a particular session initiation protocol application transition handler;

responsive to an absence of the appropriate session initiation protocol occurring in response to simulating the session initiation protocol message, sending a test failure result to the test harness;

generating a report by the test harness with the test failure result;

responsive to the appropriate session initiation protocol occurring in response to simulating the session initiation protocol message, determining whether another transition handler exists along the selected execution pathway;

responsive to the another transition handler existing along the selected execution pathway, transferring control from the artificial session initiation protocol runtime environment to the another transition handler, wherein transferring control from the artificial session initiation protocol runtime environment to the another transition handler further comprises:

determining whether a second appropriate session initiation protocol state occurs in response to simulating the session initiation protocol message for the another transition handler;

responsive to an absence of the transition handler existing along the selected execution pathway, determining whether an appropriate final execution state is achieved, wherein determining whether an appropriate final execution state is achieved further comprises;

responsive to an absence of the appropriate final execution state, sending for the another transition handler the test failure result to the test harness;

generating the report by the test harness of the test failure result for the another transition handler;

responsive to the appropriate final execution state being achieved, sending a test success result to the test harness; and generating the report by the test harness containing the test success result.

* * * * *